June 12, 1956 P. J. KIRCHER 2,750,162
IMPELLER ASSEMBLY MOUNTING FOR MIXERS
Filed Dec. 14, 1954 2 Sheets-Sheet 1
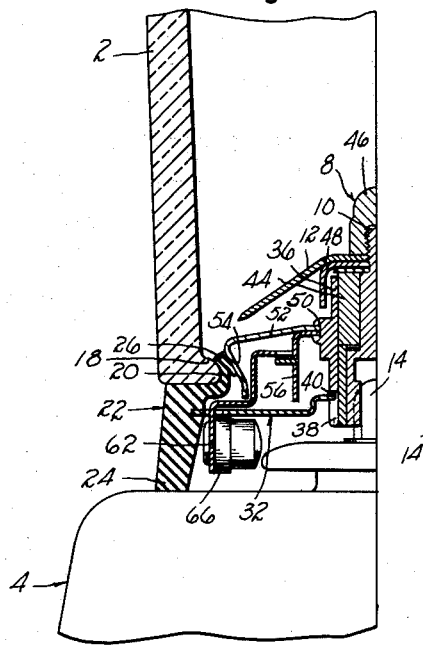
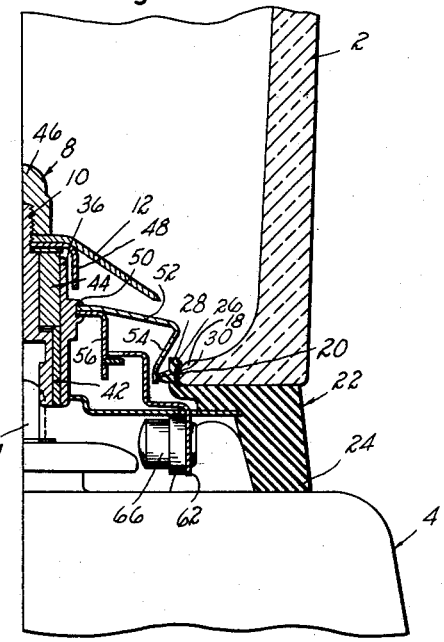
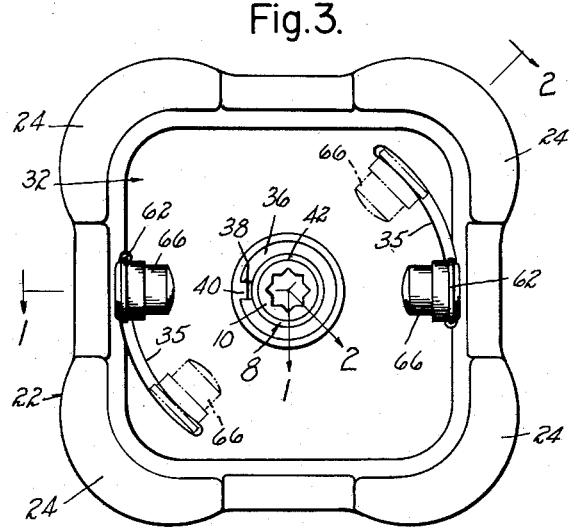
INVENTOR.
PAUL J. KIRCHER
BY
Lindsey and Pritzman
ATTORNEYS.

June 12, 1956  P. J. KIRCHER  2,750,162
IMPELLER ASSEMBLY MOUNTING FOR MIXERS
Filed Dec. 14, 1954  2 Sheets-Sheet 2

INVENTOR.
PAUL J. KIRCHER
BY
*Lindsey and Prutzman*
ATTORNEYS.

United States Patent Office 2,750,162
Patented June 12, 1956

2,750,162

IMPELLER ASSEMBLY MOUNTING FOR MIXERS

Paul J. Kircher, Plainville, Conn., assignor to Landers, Frary & Clark, New Britain, Conn., a corporation of Connecticut Application December 14, 1954, Serial No. 475,123

7 Claims. (Cl. 259—107)

This invention relates to improvements in food and drink mixers or blenders of the type having a power unit, a receptacle or container which rests on the power unit, and a rotatable cutter or impeller mounted in the bottom of the container and having a shaft projecting through the container bottom into driving engagement with a shaft on the power unit. More particularly the invention relates to such apparatus having an improved mounting arrangement for the cutter assembly which is detachable and removable from the mixing container.

Mixers for stirring and blending foods and drinks have achieved widespread use in the home and elsewhere. The presence of the rotatable impeller or cutter mounted in the bottom of the mixing container, however, has required the exercise of careful attention in washing the mixing container to insure thorough cleaning about the impeller and its mounting. It is a principal object of the present invention to eliminate this difficulty by providing in a mixer of the type described an improved impeller assembly which is readily detachable from the receptacle or container, and thereby permits washing of the container and the impeller assembly separately.

Another object is to provide a mixing container having a removable impeller assembly which may be readily and conveniently detached from or reattached to the container, whose manner of operation is simple and substantially foolproof, and which when attached to the container effects a positive seal thereto insuring a secure and leakproof connection.

Another object is to provide in a mixer of the type described a removable impeller assembly which is sturdy in construction and economical to manufacture, which may be repeatedly removed and reattached as desired, without adverse effect, and which will operate dependably for long periods without attention.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is a partly sectionalized elevation view taken on the line 1—1 of Figure 3, of a portion of a mixer constructed in accordance with the present invention, showing the relation of the parts with the impeller assembly attached to the mixing container;

Figure 2 is a view similar to Figure 1 taken on the line 2—2 of Figure 3 and showing the relation of the parts with the impeller assembly in its unlocked condition;

Figure 3 is a bottom view of the mixing container;

Figure 4:
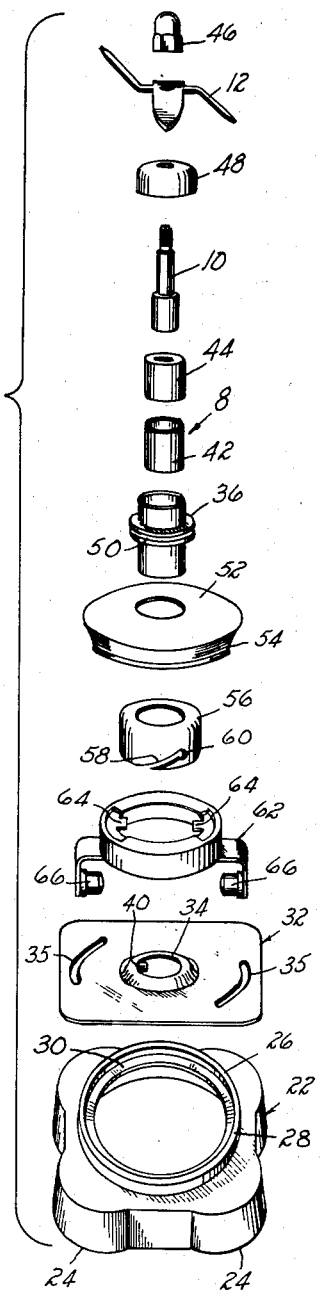
Figure 4 is an exploded perspective view to a diminished scale of the impeller assembly.
Figure 5:
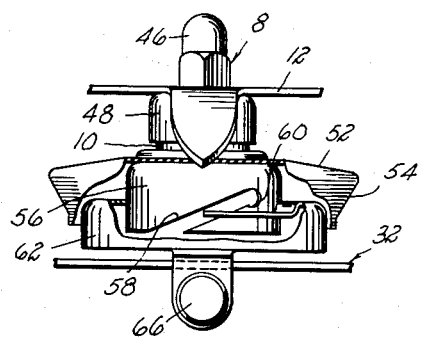
Figure 5 is a fragmentary elevation view, partly broken away, of the impeller assembly.

Referring to the drawings, a mixer of the type with which the present invention is concerned includes a receptacle or container 2, and a power unit 4 on which the mixing container is placed during a mixing operation. The mixing container mounts the impeller assembly 8, which includes an impeller shaft 10 carrying a cutter or impeller 12, and the power unit has an upright drive shaft 14 projecting from its top surface, with which the impeller shaft 10 engages when the mixing container is placed on the power unit.

The mixing container 2 has an inturned peripheral lip 18 at the bottom thereof defining a central opening 20 which receives the impeller assembly. In accordance with the invention the impeller assembly includes a centrally apertured base 22 of rubber or the like on which the bottom of the container seats and which has feet 24 adapted to rest on the top of the power unit. Integral with the base is an annular gasket 26 which extends upwardly through the opening 20 about the periphery thereof. The gasket is peripherally grooved on its inner surface to define an upstanding collar 28 and an inwardly extending lip 30.

The base 22 is reinforced by a generally horizontal bearing plate 32 supported at its periphery in a groove in the base and having a central aperture 34 and a pair of concentric arcuate slots 35. An upright bearing sleeve 36 is slidably received in the aperture 34. A longitudinal slot 38 in sleeve 36 is engaged by a tooth 40 formed on the bearing plate 32 at the periphery of the aperture 34 to prevent rotation of the bearing sleeve relative to the bearing plate. The bearing sleeve rotatably supports the impeller shaft 10 in bearings 42, 44 and the impeller 12 is secured to shaft 10 by a cap nut 46. The impeller shaft also carries an inverted cup-shaped air lock 48, the sides of which surround the bearing sleeve at its upper end so as to form an air seal preventing leakage from the container past the bearings 42, 44. The lower end of the impeller shaft is socketed for a sliding fit with the drive shaft 14 of the power unit.

Secured to the bearing sleeve in a peripheral groove 50 is an annular gasket compressor having a flaring skirt portion 52 and a downwardly and inwardly inclined peripheral flange 54 which is adapted to engage the gasket and compress collar 28 and lip 30 outwardly and downwardly on the peripheral edge of the lip 18 at the bottom of the container. The outer diameter of the gasket compressor is slightly less than that of the opening 20 so that the compressor may be readily inserted and withdrawn through opening 20 when attaching and detaching the impeller assembly and container. Also mounted on the bearing sleeve is a concentric cylindrical locking cam 56 having a pair of diametrically spaced inclined slots 58 open at their lower end and provided with detents 60 at their upper ends. Concentrically disposed between the flange 54 and the cam 56 is a generally cylindrical locking lever 62 having an inturned flange at its upper end provided with diametrically spaced arms 64 which extend through the slots 58 in the cam. Depending from the locking lever is a pair of diametrically spaced legs which extend through the arcuate slots 35 in the bearing plate and carry lugs 66 which engage the underside of the bearing plate.

In the operation of the impeller assembly, when the impeller assembly is in its unattached condition the parts of the impeller assembly are in the relative position shown in Figure 2 of the drawing. To attach the impeller assembly to the container, the impeller assembly is simply inserted through the opening 20 in the bottom of the container so that the upper surface of the base engages the bottom of the container, with the gasket compressor disposed within the container, and the gasket extending through the opening 20. Then all that it is necessary to do to complete the attachment is to rotate the locking lever 62 a partial turn to move the lugs 66 from the position shown in dotted lines in Figure 3 to that shown in solid lines in Figure 3. The rotation of the locking lever 62 engages the arms 64 with the lower sides of the slots 58 in the cam and draws the bearing sleeve 36 downwardly in the aperture 34 in the bearing plate, moving it from the position shown in Figure 2 to that shown in Figure 1. As the bearing sleeve is drawn down, the skirt 52 is also drawn down relative to base 22, and flange 54 engages the gasket 26 and wedges it downwardly and outwardly into firm sealing relation with the lip 18, thus making a positive and leakproof seal about the periphery of the opening 20. Arms 64 seat in detents 60 and prevent reverse rotation of the locking lever so that the gasket will not be inadvertently released. With the impeller assembly thus attached the container is ready to be placed on top of the power unit for a mixing operation, and feet 24 support the container securely in an upright position on the power unit with the lower end of the impeller shaft at the proper height to slide onto and mate in driving engagement with the drive shaft 14.

The impeller assembly may be detached from the container for cleaning or other purposes simply by lifting the container off the power unit and twisting the locking lever 62 a partial turn from its locked to its unlocked position. This cams the bearing sleeve upwardly to the position shown in Figure 2, releasing the flange 54 from compressing relation with the gasket, and the entire impeller assembly may then be withdrawn from the container.

Thus it may be seen that the present invention provides a detachable impeller assembly for a mixing container which is simple, convenient, and substantially foolproof to operate, and which may be easily and readily assembled and disassembled as desired to facilitate washing or for other purposes.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a food and drink mixer, a container having an inwardly extending lip at the bottom thereof defining a central opening, a base on which the container is adapted to seat having a peripheral gasket engageable with said lip, an impeller shaft rotatably supported by the base and adapted to extend upwardly through said opening, a vertically movable compressor mounted on the base having a downwardly and inwardly inclined surface between which and said lip the gasket is adapted to be compressed, and a manually operable locking member connected to said compressor and said base for clamping said compressor and gasket against said lip.

2. In a food and drink mixer, a container having a bottom provided with an opening therein surrounded by a peripheral lip, a centrally apertured removable base for the container having an integral peripheral gasket engageable with said lip, an upright impeller shaft rotatably supported by the base and carrying an impeller, said shaft adapted to extend upwardly through said opening, a vertically movable annular compressor mounted on the base having an inwardly and downwardly inclined peripheral surface between which and said lip the gasket is adapted to be compressed, and a manually operable locking member connected to said compressor and to said base for clamping said compressor and gasket against said lip.

3. A removable impeller assembly for a food and drink mixer comprising a container having an opening in the bottom thereof, an annular resilient base engageable with the bottom of the container, said base having a downwardly facing bearing surface and an annular gasket extending through said opening about the periphery thereof, a concentric nonrotatable upright bearing sleeve on the base, an impeller shaft rotatably supported in the bearing sleeve, a skirt on the bearing sleeve having an outer diameter smaller than said opening and an inwardly and downwardly inclined peripheral flange between which and the container bottom the gasket is adapted to be compressed, and clamping means connected to said skirt and engageable with said bearing surface for compressing said gasket.

4. In a food and drink mixer, a container having an inwardly extending lip at the bottom thereof defining a central opening, a removable base engageable with the bottom of the container, a gasket on the base engageable with the periphery of said lip, a vertically movable concentric cup-shaped compressor mounted on the base forming a removable bottom closure for the container, said compressor having an outer diameter smaller than said opening and having an inwardly and downwardly extending peripheral flange between which and said lip the gasket is adapted to be compressed to seal the bottom of the container, a concentric upright sleeve extending through the compressor and sealed thereto, an impeller shaft rotatably supported in the sleeve, and a locking member on the base for clamping said gasket between said compressor and said lip.

5. A removable impeller mounting for a food and drink mixer of the type including a container having a bottom provided with a central opening defined by an inwardly extending lip, said mounting comprising a removable base engageable with the bottom of the container, an upright concentric sleeve carried by the base and extending therethrough, an impeller shaft rotatably supported in the sleeve, a concentric radially extending skirt on the sleeve dimensioned to pass through said opening and forming a removable bottom closure for the container, a gasket on the base arranged to follow said skirt through said opening and engage the periphery of said lip, said skirt having an inwardly and downwardly extending peripheral surface between which and said lip the gasket is adapted to be compressed, and a clamp on the base for compressing said gasket between said skirt and lip.

6. In a mixer, a container having an opening in the bottom thereof, a removable centrally apertured base engageable with the bottom of the container and having a peripheral gasket for said opening, a bearing plate secured to the base having a central aperture and a plurality of concentric arcuate slots, a concentric upright bearing sleeve slidably and nonrotatably supported by the bearing plate, a skirt on said bearing sleeve forming a removable bottom closure for the container, said skirt having an outer diameter smaller than said opening and having an inclined peripheral flange between which and said container bottom the gasket is compressed, a cam connected to said bearing sleeve having a plurality of concentric upwardly facing inclined shoulders, a rotatable locking lever having depending legs extending through said slots and arms engageable with said shoulders, lugs on said legs engageable with the bottom side of said bearing plate, and an impeller shaft rotatably mounted in said bearing sleeve and having a socketed lower end adapted to slide onto a drive shaft.

7. In a mixer, a container having an opening in the bottom thereof, a removable annular rubber base engageable with the bottom of the container, an annular gasket integral with the base extending through said opening about the periphery thereof, a bearing plate secured to the underside of the base having a central aperture and a pair of concentric arcuate slots, an upright bearing sleeve slidably and non-rotatably supported in said bearing plate aperture, a skirt on said bearing sleeve forming a removable bottom closure for the container, said skirt having an outer diameter smaller than said opening and having an inwardly and downwardly inclined peripheral flange between which and said container bottom the gasket is compressed, a concentric cylindrical cam carried by said bearing sleeve having a pair of concentric diametrically spaced inclined slots, a rotatable locking lever on said bearing plate having depending legs extending through said arcuate slots and arms extending through said inclined slots, lugs on said legs engageable with the bottom side of said bearing plate, an impeller shaft rotatably mounted in said bearing sleeve and having a socketed lower end adapted to slide onto a drive shaft, and depending feet integral with said base adapted to rest on a power unit.

References Cited in the file of this patent

FOREIGN PATENTS 512,665   Belgium ---------------- July 31, 1952